Jan. 22, 1957   C. D. VISOS   2,778,902
IMPACT RELEASE TOASTER SWITCH
Filed Oct. 10, 1955   2 Sheets-Sheet 1
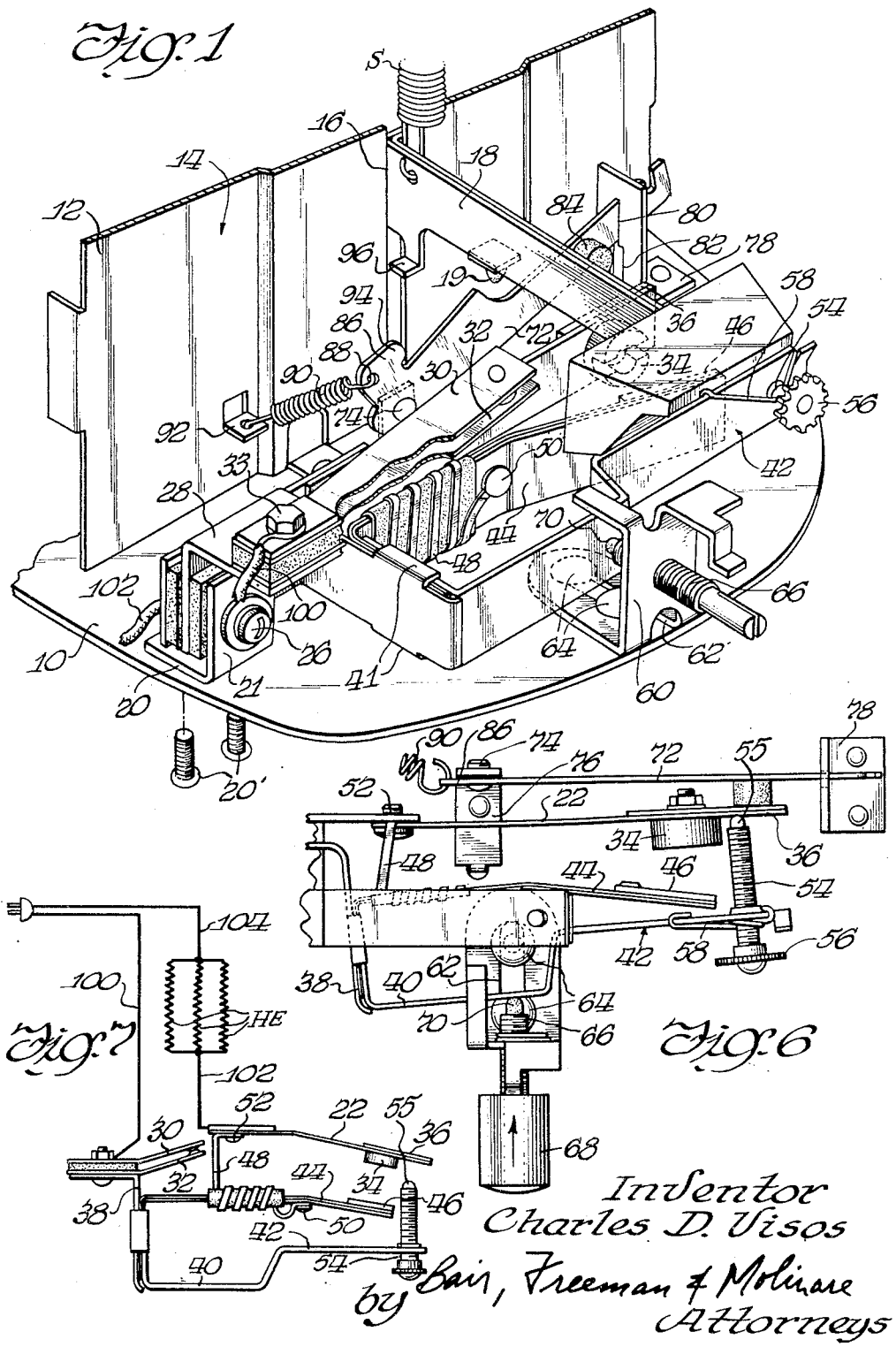
Inventor
Charles D. Visos
by Bair, Freeman & Molinare
Attorneys

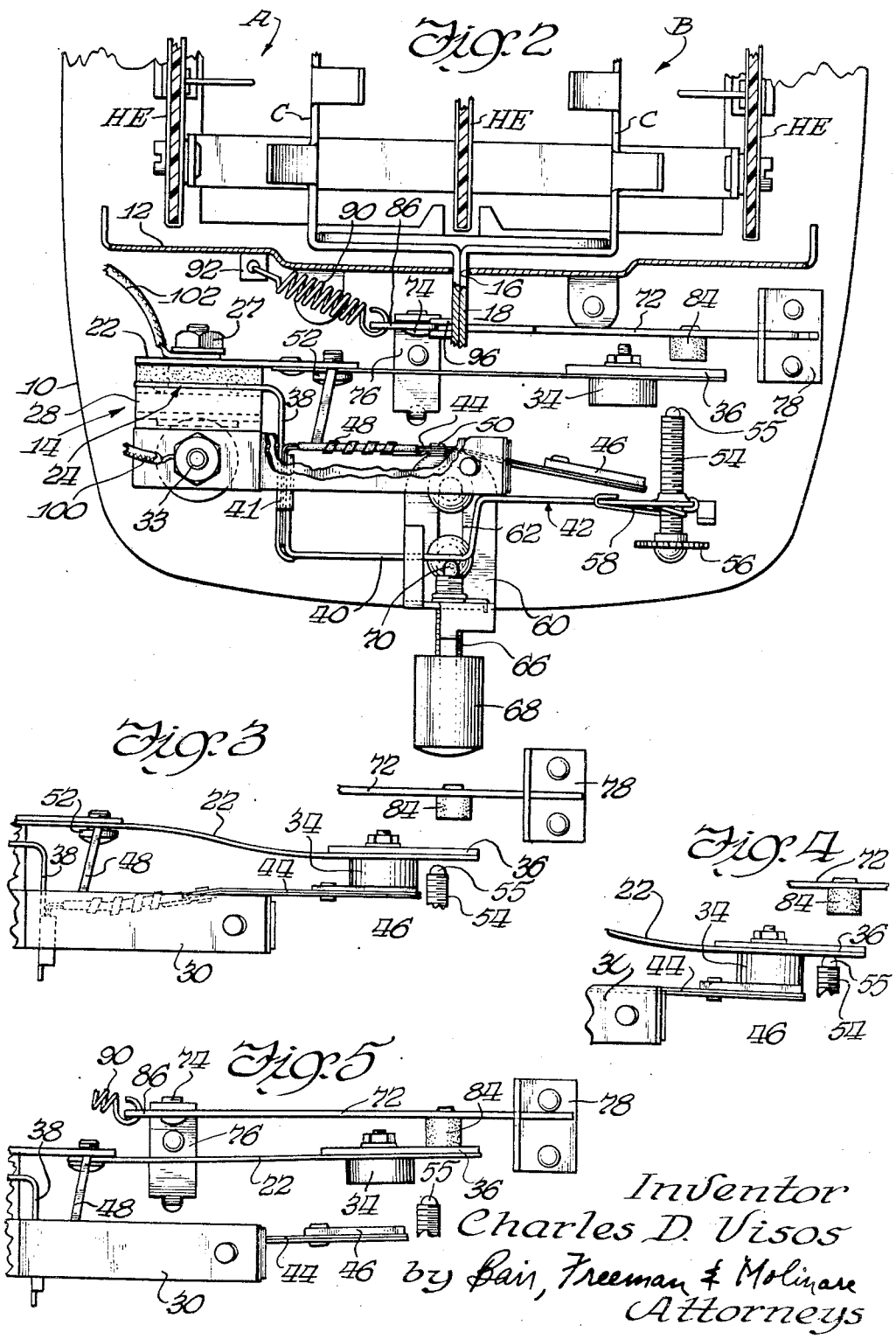

2,778,902
IMPACT RELEASE TOASTER SWITCH

Charles D. Visos, St. Louis, Mo., assignor to Knapp-Monarch Company, St. Louis, Mo., a corporation of Delaware Application October 10, 1955, Serial No. 539,481

5 Claims. (Cl. 200—138)

This invention relates to a control mechanism for toasters and the like and more particularly to a control mechanism including a mechanical latch means and a potentializable impact means for displacing the latch mechanism from its latched position. This invention is an improvement over that disclosed in U. S. Patent No. 2,545,662 to Huck et al., issued March 20, 1951.

Impact-type control switches have been used heretofore in toasters, as shown in said U. S. Patent No. 2,545,662. However, one of the drawbacks, or deficiencies, of said previous toasters lay in the fact that such impact-type switches were located in the toaster base below the chamber wherein the bread was toasted. A more simplified arrangement of controls and actuating parts, particularly from the standpoint of factory assembly, is obtained when the controls are mounted in an end chamber of the toaster which is laterally offset from the chamber wherein the bread is to be toasted.

While the positioning of toaster controls in an end chamber, laterally of the toasting chamber, is not broadly new, no one has, heretofore, succeeded in providing a toaster with an impact-type control means which is positionable in an end chamber of a toaster.

Thus, one object of this invention is to provide a toaster having an impact-type control which is positioned in an end chamber of the toaster, located laterally of the toasting chamber thereof.

Another object of this invention is to provide an impact-type control which includes a potentializable impact means which is thermally controlled for potentialization, and which is thereafter triggered, by engagement of the potentialized impact means with an abutment means, to transfer an impulse from the impact means to a movable latch means, and wherein both said thermal control and said abutment means are carried by a rigidly mounted but distortable bracket which is arranged to also permit of overriding of the impact-means control.

Further objects and advantages will become apparent as the following description of the invention proceeds. The invention consists in the construction, arrangement and combination of the various parts of my device, whereby the objects contemplated are attained, as hereinafter more fully set forth, and as pointed out in the claims and illustrated in the accompanying drawings wherein:

Figure 1 is a perspective view of the interior of an end chamber of a toaster provided with the impact-type control of this invention;

Figure 2 is a top plan view of the structure in Figure 1;

Figures 3, 4, and 5 are successive views, from a time standpoint, of a portion of the mechanism in Figure 2. In Figure 3, the impact means are shown during potentialization thereof and just before engagement with the abutment means; in Figure 4, the impact means are shown in engagement with the abutment means as the potentialized abutment means is being triggered; in Figure 5, the impact means are shown engaging the latch means to cause unlatching of the latching mechanism;

Figure 6 shows a portion of Figure 2 with the parts arranged as they would be when the control mechanism is being manually overridden; and Figure 7 is a schematic wiring diagram of a toaster incorporating my novel control.

Referring now to the drawings there is shown the interior of the end portion of a toaster which includes a toaster base member 10, and an upright partition 12, as seen in Figure 1. To the left of the partition 12 are the toasting chambers within which bread is toasted. To the right of upright panel 12 is an end chamber, generally designated by numeral 14, within which is mounted the impact-type control of this invention.

As best seen in Figure 2, the bread toasting portion of the toasting portion of the toaster is divided into two chambers, A and B, for toasting a pair of slices. Heating elements HE, are suitably provided on opposite sides of the toasting chambers. There is an elongated passageway 16 in panel 12 through which extends a control arm 18 that is connected to, and moves with a pair of bread carriers C, which are positioned in the pair of bread toasting chambers, A and B. The bread carrier C and control arm 18 are normally biased toward an elevated position by a carriage-return spring S, which is potentialized by the lowering of the control arm 18. The details of construction of the aforementioned bread toasting chamber, heating elements, bread carriers, and carriage-return spring are well known and do not form a part of this invention.

Within the end chamber 14 of the toaster, there is mounted, on base member 10, an angle-shaped bracket 20 which is suitably secured to the base by means of a pair of threaded bolts 20'. Mounted on the upstanding arm 21 of bracket 20 is a portion of the control mechanism which includes an elongated, electrically conductive leaf spring 22, and an electrically conductive elongated bracket means 24. The leaf spring 22 and elongated bracket means 24 are appropriately insulated from each other. Arm 21 of bracket 20 carries thereon a bolt 26 and nut 27 which cooperates to maintain the leaf spring 22 and elongated bracket means in position. Bolt 26 also carries a second angle-shaped bracket 28 which is in conductive relation with elongated bracket means 24. The second bracket 28 carries thereon a normally open switch means which includes leaf springs 30 and 32. Leaf spring 32 is in conductive relation with bracket 28. Leaf spring 30 is insulated from leaf spring 32 but is assembled in stacked relation thereto by bolt 33.

The elongated leaf spring 22 carries, at the extended end thereof, a magnet 34; and a portion 36 of leaf spring 22 extends beyond magnet 34. The leaf spring 22 and parts thereon serve as a potentializable impact means, as will appear from the following description.

The elongated bracket means 24 is composed of a first angle-shaped portion 38 of resilient spring blade material and a second angle-shaped portion 40 of relatively rigid material. The angle-shaped portions 38 and 40 may be secured together by any appropriate means, and, as particularly shown by means of bent over tabs 41 carried on angle-shaped portion 38. The second angle-shaped portion 40 is shaped to define an abutment carrying portion 42 at the extended end of the elongated bracket means. Mounted between the overlapping sections of bracket portions 38 and 40 is an angle-shaped bimetal member 44 which is rigidly mounted relative to the relatively rigid bracket portion 40 and which bimetal member carries, at the extended end thereof, a magnet keeper 46. Wrapped around a portion of bimetal 44 is a resistance type control-heater element 48 which makes contact at one end, at 50, on the bimetal and contacts at its other end, at 52, with the elongated leaf spring 22. The bimetal 44 with heater 48 wrapped therearound comprises a thermally controlled means.

The abutment carrying portion 42 of bracket means 24 carries thereon a threaded bolt 54 having a silver tip 55 and a head 56 on said bolt 54 which affords adjustability as to the position of the silver tip 55 of the abutment means 54 with respect to the extended end 36 of the leaf spring 22. Suitable spring-type lock means 58 are provided for maintaining the abutment means 54 in a selected position.

A manual control is provided for the toaster and includes the bracket 60 which is carried on the base member 10. The bracket 60 has an elongated slot 62 therein; and the heads of a pair of bolts 64, carried by base member 10, provide for reciprocal movement of the bracket 60 along said slot 62, relative to said bolt heads 64. The bracket 60 carries thereon a threaded manual toast color-adjustment control 66 having an insulated grasping knob 68 thereon which extends outwardly of the toaster casing. The extended end of threaded member 66 has an insulator button 70 thereon adapted to have the elongated bracket means 24 bear thereagainst, as said resilient spring blade portion 38 of bracket means 24 is arranged so that it is normally biased outwardly to bear against the insulator button 70 under a predetermined tension. Thus, in the normal operating position shown in Figures 1 and 2, the spring blade portion 38 of elongated bracket means 24 is slightly distorted from its normal undistorted position toward leaf spring 22 against the inherent resiliency of the spring blade portion 38 of said bracket means. This arrangement is such that when the manual control 68 is pushed inwardly, as shown in Figure 6, the bracket 60 slides relative to the heads of bolts 64 so as to permit further distortion of the elongated bracket means 24 toward leaf spring 22.

A latch means is provided adjacent the control thus far described. This latch means includes an elongated pivotally mounted latch arm, or control arm, 72 which is mounted for pivotal movement on a pin 74 carried on a bracket 76 which is mounted on the base 10 of the toaster. The pivotal mounting of arm 72 on pin 74 is such as to also permit lateral swinging, or wobble, of the control arm 72 in a plane transverse to the plane in which control arm 72 pivots about pin 74. The extended end of latch arm 72 is mounted in a labyrinth means which includes the slots in a bracket 78 that is secured to the base 10 of the toaster. The labyrinth means includes a first, or upper-stop-position, slot 80 and a second, or lower-stop-position, slot 82 that is laterally offset with respect to slot 80. Intermediate the ends of the arm 72 is an insulating button, or abutment member, 84 against which the impact means, end portion 36 of spring leaf 22, is adapted to strike. The end of the arm 72 adjacent the pivot pin 74 is formed with an enlargement 86 having a hole 88 therein to which one end of a spring, or control-arm bias means, 90 is attached. The other end of spring 90 is attached to a flange 92 that is stricken from the upright panel 12. The axis of spring 90 is located at an angle relative to the plane of arm 72, as best seen in Figures 1 and 2, so that the force of the spring causes the extended end of arm 72 to bear both upwardly, for entrance into slot 80, and laterally, for entrance into slot 82.

The enlargement 86 on latch arm 72 also carries a lip 94 which is adapted to latch over a flange 96 formed on the control arm 18 of the bread carrier in a manner as will be more fully described hereinafter.

The leaf springs 30 and 32 of the switch means are normally separated, but the leaf spring 30 may be forced into electrical conducting relation with leaf 32 by the control arm 18 which extends from the bread carrier.

The circuit for the control system herein shown and described, and including the switch 30—32 in closed condition, is shown diagrammatically in Figure 7 and includes lead 100, leaf 30, leaf 32, control-heater 48, lead 102, the heater elements HE, and lead 104.

Operation

In operation, after the bread is loaded onto the bread carriage C, the arm 18, which is connected to the carriage, is manually depressed to lower the bread into a bread toasting position. As the arm 18 is lowered, it operates, through insulator 19 carried thereby, to engage leaf spring 30 and force leaf spring 30 into electrical conductive engagement with leaf spring 32, thereby closing the switch to the heating elements HE and energizing the circuit therethrough. At the same time, the control arm 18, through the flange 96 extending therefrom, engages the latch arm 72 and forces it downwardly, out from the slot, or first stop-position, 80 to a point where the spring 90 is operative to swing the extended end of latch arm 72 into the slot, or second stop-position, 82, thereby latching the latch arm 72 in the operative, closed-switch position. At the same time, the flange 94 on latch arm 72 swings over flange 96 and engages flange 96 to keep arm 18, and thereby the carriage C, in said latched, lowered position, against the bias of the potentialized carriage-return spring S.

Thus, the heating circuits for the toaster have been energized and the following control cycle ensues.

Upon the switch through leaves 30—32 being closed, current is caused to pass through the control heating element 48 which is wrapped around the bimetal 44. This causes the bimetal 44 to warp in a direction so that the magnet keeper 46 is swung toward the permanent magnet 34 until the magnet keeper 46 and 34 are so close to each other that the magnetic force developed therebetween is operative to cause the two to engage. Upon engagement of the magnet keeper 46 with the magnet 34, there is established a short circuit through the magnet keeper 46 and the magnet 34 which substantially cuts down any further heating of the heating element 48.

After said short circuit is established, the bimetal 44 begins to cool and in so doing swings back toward its original condition, which original condition is best seen in Figures 1 and 2. During the swing-back toward the original position, the leaf spring, or impact means, 22 is distorted and thereby potentialized.

The arrangement, shape, and resiliency, of the bimetal 44 and leaf spring 22 is such that during the period of time wherein the magnet 34 and magnet keeper 46 are in engagement, said magnet 34 and magnet keeper 46 are aligned in flat, parallel, engagement with each other, as best seen in Figures 3 and 4. Such flat alignment is desirable to provide for full magnetic holding power being developed, and to provide that triggering of the potentialized impact means occurs only after the designed lapse of time during which the impact means is being potentialized by the cooling off of the bimetal.

As the swing-back of the bimetal 44 toward the original condition continues the extended end of the spring leaf 22 eventually engages the silver tip 55 of abutment 54 and when the force between abutment 54 and spring leaf 22 is sufficient to overcome the magnetic attraction between magnet keeper 46 and magnet 34, the potentialized spring 22 is suddenly released, thereby separating magnet 34 and magnet keeper 46 and triggering the potentialized impact means, and spring leaf 22 then swings in the direction toward the latch arm 72 and strikes the anvil, or abutment member 84 carried thereon. This dislodges the latch arm 72 out of the slot 82, from the closed-switch latching position, to a position where the spring 90 is operative to swing the latch arm 72 upwardly into the slot, or first stop position, 80.

At the time that spring leaf 22 engages the silver tip 55 of abutment 54, as described hereinabove, there is established a second by-pass circuit, or short circuit, of the heating element 48, which by-pass circuit includes, in part, the spring leaf 22, the silver tip 55, abutment 54, bracket 42, and bracket 38. The tip 55 of abutment 54 is made of silver so as to provide very good contact with spring plate 22. This arrangement provides that the very instant when the magnet 34 is being separated from the magnet keeper 46, that there is still maintained a circuit between spring leaf 22 and abutment 54, and this latter circuit prevents arcing between the magnet 34 and the magnet keeper 46 as said members are being separated.

As the latch arm 72 swings upwardly toward the first stop position 80 in the labyrinth means, the flange 96 is released and the spring S which had theretofore been potentialized as the carrier was lowered, is operative to take over and restore the bread carrier to its upper position where the toasted bread slices are exposed from the toaster and where the toasting operation has been brought to an end because of the opening of the switch 30—32.

It will be seen that the automatic control herein described can be overridden by the manual control 68 being pushed inwardly to distort and further potentialize the bracket means 24 and to force the abutment member 54 to engage spring leaf 22 and force the same against the abutment 84 carried on the latch arm 72, as best seen in Figure 6, the potentialized bracket means 24 being operative to restore manual control 68 to its initial condition after release thereof.

Furthermore, it will be seen that by simple adjustment of the abutment 54 and by simple threaded adjustment of the threaded bolt 66 it is possible to vary the point at which the potentialized spring leaf 22 is triggered, thereby varying the period of operation of the control device herein described so as to produce lighter or darker toast, as desired.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A control mechanism comprising, in combination, a potentializable impact means, thermally controlled means for potentializing said impact means, abutment means for engaging the potentialized impact means to trigger same after a predetermined potentialization has occurred, means positioned to be actuated by transfer of kinetic energy from the potentialized impact means after triggering thereof, and an elongated bracket rigidly mounted at one end thereof and being adapted for potentializing distortion thereof by swinging from a normal position, wherein said bracket is slightly distorted, toward said potentializable impact means to, thereby, further distort and potentialize said bracket for return to said normal position, said elongated bracket carrying said abutment means and thermally controlled means for movement therewith.

2. A control mechanism comprising, in combination, a potentializable impact means, thermally controlled means for potentializing said impact means, abutment means for engaging the potentialized impact means to trigger same after a predetermined potentialization has occurred, means positioned to be actuated by transfer of kinetic energy from the potentialized impact means after triggering thereof, and an elongated bracket rigidly mounted at one end thereof and being adapted for potentializing distortion thereof by swinging from a normal position, wherein said bracket is slightly distorted, toward said potentializable impact means to, thereby, further distort and potentialize said bracket for return to said normal position, said elongated bracket carrying said abutment means and thermally controlled means for movement therewith, and a manual control in operative association with said elongated bracket for varying the degree of potentialization of said impact means which may be effected by said thermally controlled means.

3. A control mechanism comprising, in combination, a potentializable impact means, thermally controlled means for potentializing said impact means, abutment means for engaging the potentialized impact means to trigger same after a predetermined potentialization has occurred, normally open switch means, the closing of which is operable to initiate energization of said thermally controlled means, a cycle setting means movable against a restoring bias into switch-closing association with said switch means, an elongated control arm mounted adjacent one end thereof so as to permit movement thereof in two planes transverse to each other, labyrinth means having the other end of said control arm movable therein and defining two stop positions for said control arm, control-arm bias means biasing said control arm for movement in one direction in each of said two planes and toward the two stop positions in said labyrinth means, said cycle setting means being operative to move said control arm along said labyrinth means from a first of said stop positions to a position where said control-arm bias means moves said control arm into the second stop position, a latch means defined by said control arm and cycle setting means cooperating to maintain said cycle setting means in said switch-closing position, when said control arm is in the second stop position, and said impact means being movable into impact-type engagement with said control arm, while said control arm is in said second stop position, to move said control arm along said labyrinth means into a position where said control-arm bias means moves said control arm into the first stop position and thereby releases said cycle setting means to the control of the restoring bias therefor.

4. A control mechanism comprising, in combination, a potentializable impact means, thermally controlled means for potentializing said impact means, abutment means for engaging the potentialized impact means to trigger same after a predetermined potentialization has occurred, normally open switch means, the closing of which is operable to initiate energization of said thermally controlled means, a movable control arm, labyrinth means associated with said control arm for maintaining said control arm either in a first position corresponding to an open-switch condition and in a second position corresponding to a closed-switch condition, a cycle setting means movable against a restoring bias to close said switch means to initiate a control cycle and to engage and move said control arm toward said second position, means carried by said control arm for engaging and maintaining said cycle setting means in said closed-switch position, and said potentialized impact means, after being triggered, being operable to engage and move said control arm toward said first position to thereby effect release of said cycle setting means and permit said switch means to open.

5. A control mechanism comprising, in combination, a potentializable impact means, thermally controlled means for potentializing said impact means, abutment means for engaging the potentialized impact means to trigger same after a predetermined potentialization has occurred, normally open switch means, the closing of which is operable to initiate energization of said thermally controlled means, a movable control arm, labyrinth means associated with said control arm for maintaining said control arm either in a first position corresponding to an open-switch condition and in a second position corresponding to a closed-switch condition, a cycle setting means movable against a restoring bias to close said switch means to initiate a control cycle and to engage and move said control arm toward said second position, means carried by said control arm for engaging and maintaining said cycle setting means in said closed-switch position, and said potentialized impact means, after being triggered, being operable to engage and move said control arm toward said first position to thereby effect release of said cycle setting means and permit said switch means to open, and control-arm bias means biasing said control member in directions for movement toward both of said defined positions.

References Cited in the file of this patent

UNITED STATES PATENTS 2,545,662     Huck et al. _____ Mar. 20, 1951
2,624,268     Horvath _____ Jan. 6, 1953